US011544522B2

(12) United States Patent
Li et al.

(10) Patent No.: US 11,544,522 B2
(45) Date of Patent: Jan. 3, 2023

(54) METHODS, SYSTEMS, AND COMPUTER READABLE MEDIUMS FOR DETERMINING A SYSTEM STATE OF A POWER SYSTEM USING A CONVOLUTIONAL NEURAL NETWORK

(71) Applicant: University of Tennessee Research Foundation, Knoxville, TN (US)

(72) Inventors: Fangxing Li, Knoxville, TN (US); Yan Du, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 937 days.

(21) Appl. No.: 16/381,934

(22) Filed: Apr. 11, 2019

(65) Prior Publication Data

US 2020/0184308 A1     Jun. 11, 2020

Related U.S. Application Data

(60) Provisional application No. 62/775,970, filed on Dec. 6, 2018.

(51) Int. Cl.
| | | |
|---|---|---|
| *G06N 3/04* | (2006.01) | |
| *H02J 13/00* | (2006.01) | |
| *G05B 13/02* | (2006.01) | |

(52) U.S. Cl.
CPC ............ *G06N 3/04* (2013.01); *G05B 13/027* (2013.01); *H02J 13/0017* (2013.01); *H02J 2203/10* (2020.01); *H02J 2203/20* (2020.01)

(58) Field of Classification Search
CPC ............... H02J 2203/20; H02J 2203/10; H02J 13/0017; G06N 3/04; G05B 13/027
See application file for complete search history.

(56) References Cited

U.S. PATENT DOCUMENTS

| 2018/0129893 A1* | 5/2018 | Son | G06N 3/063 |
|---|---|---|---|
| 2020/0119556 A1* | 4/2020 | Shi | G06N 3/08 |

FOREIGN PATENT DOCUMENTS

| CN | 109144987 A | * | 1/2019 | ............. G06N 3/088 |
|---|---|---|---|---|
| CN | 107391852 B | * | 7/2020 | ............. G06F 30/20 |

OTHER PUBLICATIONS

Tejada-Arango et al., "Security Constrained Unit Commitment Using Line Outage Distribution Factors," IEEE Trans Power Syst., vol. 33, No. 1, pp. 329-337 (Jan. 2018).

(Continued)

*Primary Examiner* — Harry R Behm
(74) *Attorney, Agent, or Firm* — Jenkins, Wilson, Taylor & Hunt, P.A.

(57) ABSTRACT

Methods, systems, and computer readable mediums determining a system state of a power system using a convolutional neural network using a convolutional neural network are disclosed. One method includes converting power grid topology data corresponding to a power system into a power system matrix representation input and applying the power system matrix representation input to a plurality of convolutional layers of a deep convolutional neural network (CNN) structure in a sequential manner to generate one or more feature maps. The method further includes applying the one or more feature maps to a fully connected layer (FCL) operation for generating a respective one or more voltage vectors representing a system state of the power system.

14 Claims, 8 Drawing Sheets

(56) References Cited

OTHER PUBLICATIONS

Goodfellow et al., "Deep Learning," Cambridge: MIT press, pp. 326-327 (2016).
Li et al., "From AlphaGo to Power System AI: What Engineers Can Learn from Solving the Most Complex Board Game," IEEE Power & Energy Magazine, vol. 16, Issue 2, pp. 76-84 (Mar. 2018).
Majidi-Qadikolai et al., "Stochastic Transmission Capacity Expansion Planning with Special Scenario Selection for Integrating N-1 Contingency Analysis," IEEE Trans Power Syst., vol. 31, pp. 4901-4912 (Nov. 2016).
Sunitha et al., "Online Static Security Assessment Module Using Artificial Neural Networks," IEEE Trans Power Syst., vol. 28, No. 4, pp. 4328-4335 (Nov. 2013).

\* cited by examiner

METHODS, SYSTEMS, AND COMPUTER READABLE MEDIUMS FOR DETERMINING A SYSTEM STATE OF A POWER SYSTEM USING A CONVOLUTIONAL NEURAL NETWORK

CROSS-REFERENCE TO RELATED APPLICATIONS

This application claims benefit of U.S. Provisional Patent Application Ser. No. 62/775,970, filed Dec. 6, 2018, which is herein incorporated by reference in its entirety.

STATEMENT OF GOVERNMENT SUPPORT

This invention was made with government support under Contract No. EEC-1041877 awarded by the National Science Foundation. The government has certain rights in the invention.

TECHNICAL FIELD

The subject matter described herein relates to deep convolutional neural networks and power system flow calculations. More particularly, the subject matter described herein relates to methods, systems, and computer readable mediums for determining a system state of a power system using a convolutional neural network.

BACKGROUND

Traditionally, power system flow equations are solved by a model-based analytical method, such as the Newton-Raphson method, fast-decoupled method, DC power system flow method, and the like. However, with the increasing penetration of renewable energy and demand side resources into the bulk power grid, conducting accurate system modeling and determining the related solutions becomes more difficult with the uncertainty involved. Namely, the growing number of these energy sources and resources being introduced into power grid systems has presented considerable uncertainty and risk to system-wide operations and stability. Consequently, a significant number of different scenarios that need to be considered for power system flow calculations and traditional power-flow-based contingency screenings may be required. In these instances, traditional model-based power system flow calculation methods may experience significant computational burdens and fail to meet real-time and multi-scenario analysis requirements. For example, in a typical N-k contingency analysis, conventional analytic methods can only function in an off-line (e.g., non-real time) manner due to the requisite heavy computational burden. These analytic methods are likely to fail in instances of resource integration on a large scale or dimension.

Thus, there currently exists a need in the art for determining a system state of a power system using a convolutional neural network.

SUMMARY

The subject matter described herein includes methods, systems, and computer readable mediums for determining a system state of a power system using a convolutional neural network. One method includes converting power grid topology data corresponding to a power system into a power system matrix representation input and applying the power system matrix representation input to a plurality of convolutional layers of a deep convolutional neural network (CNN) structure in a sequential manner to generate one or more feature maps. The method further includes applying the one or more feature maps to a fully connected layer (FCL) operation for generating a respective one or more voltage vectors representing a system state of the power system.

A system for determining a system state of a power system using a convolutional neural network includes a power grid flow assessment (PGFA) entity comprising at least one processor and memory. The system further includes a deep convolution neural network (CNN) engine stored in the memory and when executed by the at least one processor is configured for converting power grid topology data corresponding to a power system into a power system matrix representation input, applying the power system matrix representation input to a plurality of convolutional layers of a deep CNN structure in a sequential manner to generate one or more feature maps, and applying the one or more feature maps to a fully connected layer (FCL) operation for generating a respective one or more voltage vectors representing a system state of the power system.

The subject matter described herein may be implemented in hardware, software, firmware, or any combination thereof. As such, the terms "function" "node" or "engine" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It is an object of the presently disclosed subject matter to provide methods, systems, and computer readable mediums for determining a system state of a power system using a convolutional neural network.

An object of the presently disclosed subject matter having been stated hereinabove, and which is achieved in whole or in part by the presently disclosed subject matter, other objects will become evident as the description proceeds hereinbelow.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
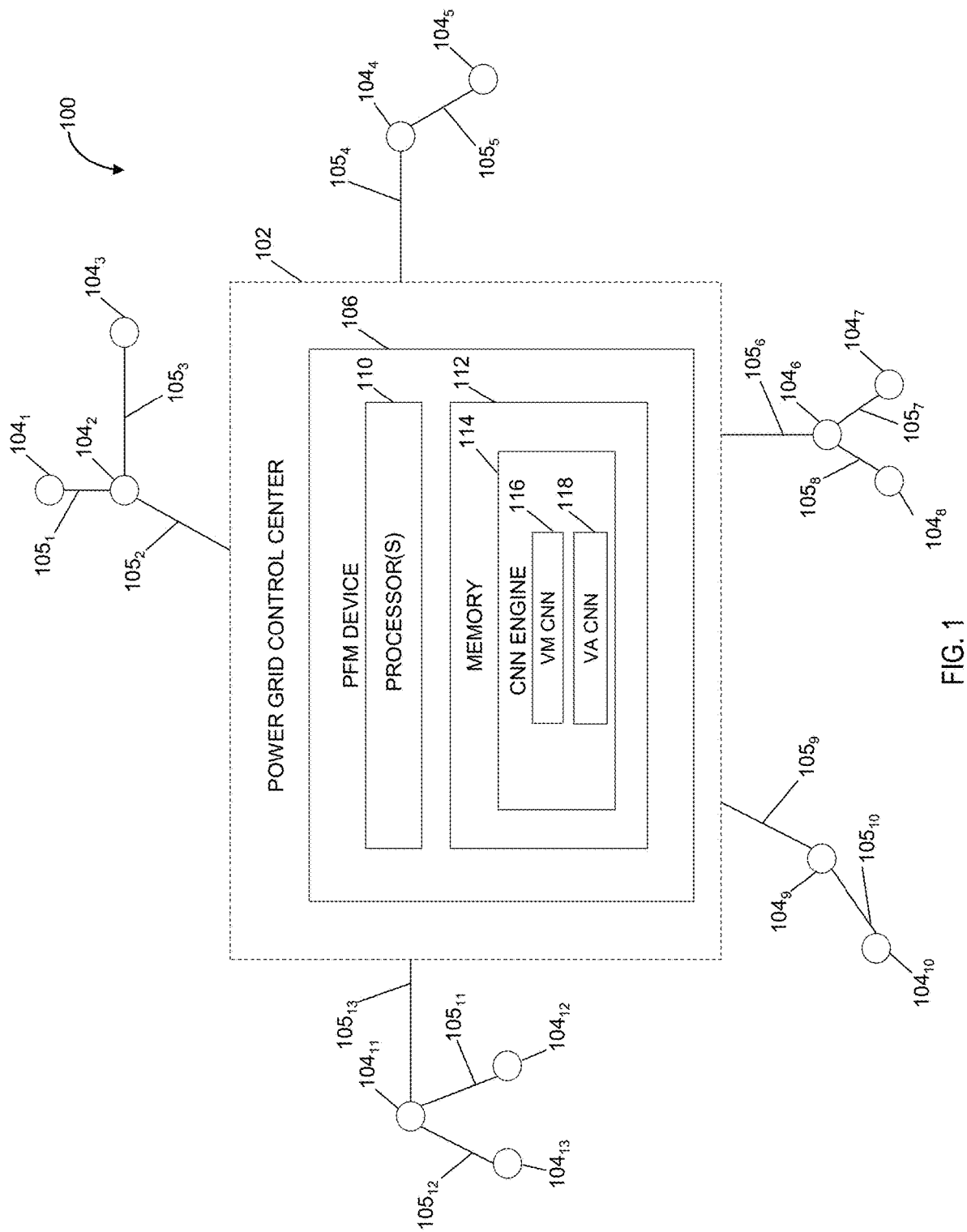
FIG. 1 is a block diagram illustrating an exemplary system for determining a system state of a power system using a convolutional neural network according to an embodiment of the subject matter described herein.

In accordance with some embodiments, the presently disclosed subject matter provides a data-driven method for determining a system state of a power system using a convolutional neural network (e.g., to determine a power system flow solution). Since power system flow is the foundation for many power system studies (including but not limited to transmission capacity planning, security-constrained economic dispatch and unit commitment, and contingency screening-based security assessment), the proposed method and system can contribute to improving the computational efficiency and accuracy of power flow calculation related problems. The primary deficiency of traditional model-based methods pertains to the large number of power system flow calculations, which pose significant computational burdens that prevents any online application (even with proper model simplification). To address this issue, the disclosed data-driven method, which is similar to image processing, is used to accelerate N−1 contingency screenings under multiple uncertain scenarios. Notably, a deep convolutional neural network (CNN) engine is configured and utilized as a regression tool for alternating current (AC) power system flow calculations. After the deep CNN engine is well trained, it is expected to improve computational efficiency by around 100 times as compared with the conventional model-based methods used in N−1 contingency screening. It should be noted that the CNN engine solution can deal with a topological change under N−1 contingency without the need for additional trainings.

Further, according to some embodiments of the new CNN engine and method, no algebraic functions need to be formulated in order to model a given power grid system. Instead, the CNN engine can learn the power system topology and the mapping between the power system control variables and system state variables via feature extraction from existing power system flow results. The feature extraction used by the CNN engine is completed by the convolution operation. Once the neural network(s) is equipped with the knowledge of the power system flow calculation, the host CNN engine can be adapted to assess new test cases characterized by different operation conditions to obtain power system flow results without intensive computation. This method is extremely desirable in case of multi-scenario power system problems where a large number of power system flow equations need to be solved. Example scenarios include, but are not limited to, transmission capacity planning, security-constrained economic dispatch and unit commitments, stochastic power system flows, and contingency screening-based security assessments. A well-trained neural network executed by the CNN engine can output the power system flow results instantaneously with the given operation conditions, thereby experiencing improved computation efforts and providing for deployment in online applications. In some embodiments, potential online applications include, but are not limited to, real-time security assessment, cascading outage screening, stochastic power flow, robust unit commitment, and other power system planning or operation problems.

FIG. 1 is a block diagram illustrating an exemplary system for determining a system state of a power system using a convolutional neural network according to an embodiment of the subject matter described herein. Specifically, FIG. 1 depicts a logical block diagram of a power grid system 100 that includes a plurality of nodes $104_{1 \ldots 13}$ that are interconnected via a plurality of edges $105_{1 \ldots 13}$. In some embodiments, each of the plurality of nodes $104_{1 \ldots 13}$ can represent a power grid system element, such as a power substation, a power plant, or other power distribution center, or the like. Likewise, each of the plurality of edges $105_{1 \ldots 13}$ can represent a physical connection, such as a high-voltage power transmission line or similar physical connection. As shown in FIG. 1, power grid system 100 further includes a power grid control center 102, which may include a power plant control room or operations center. Power grid control center 102 is connected to the plurality of nodes $104_{1 \ldots 13}$ via the plurality of edges $105_{1 \ldots 13}$. Although FIG. 1 depicts thirteen nodes connected directly or indirectly to power grid control center 102 via thirteen edges, any number of nodes and/or edges can be connected with each other and control center 102 in any manner without departing from the scope of the disclosed subject matter.

Power grid control center 102 is configured with a power function management (PFM) device 106. In some embodiments, PFM device 106 may include one or more processors 110, such as a central processing unit (e.g., a single core or multiple processing cores), a microprocessor, a microcontroller, a network processor, an application-specific integrated circuit (ASIC), or the like. PFM device 106 may also include memory 112. Memory 112 may comprise random access memory (RAM), flash memory, a magnetic disk storage drive, and the like. In some embodiments, memory 112 may be configured to store a CNN engine 114. Notably, CNN engine 114 stored in memory 112 can perform various monitoring, management, and/or remediation functionalities for PFM device 106 when executed by one or more processors 110. In some embodiments, CNN engine 114 is implemented by executing a deep convolutional neural network ("deep CNN") tool that configured to obtain power system flow results as a data mining-based solution instead of an analytical solution. Deep CNN is known for its automatic feature extraction ability in processing data characterized by a grid-like topology, such as image data. The term "deep" indicates that there are multiple 'hidden' layers within the neural network besides the input layer and the output layer. More specifically, the term "deep" indicates that the neural network that is facilitated by CNN engine 114 contains many convolution layers for efficient extraction of feature elements. Each hidden layer comprises a group of convolution kernels (or filters) that extract features from the input (e.g., input matrix) via a convolution operation and can be used to generate a feature map. As the neural network executed by CNN engine 114 progresses through the hidden layers, more features will be captured and analyzed by the convolution kernel.

As used herein, a deep CNN comprises an artificial neural network that may be embodied as a computational model based on the structure and functions of biological neural networks. Information that flows through such a network as input affects the structure of the neural network because a neural network changes or learns based on that input. In some embodiments, the CNN engine can be configured to execute a plurality of neural network structures, such as voltage magnitude CNN 116 and voltage angle CNN 118. Specifically, voltage magnitude CNN 116 and voltage angle CNN 118 may be considered nonlinear statistical data modeling tools where the complex relationships between inputs and outputs are modeled or patterns are found by CNN engine 114.

Deep CNN is further characterized by a feature called 'sparse connectivity'. In image data, one pixel is closely related to its neighboring pixels, but is less related to the pixels that are far away. As such, in deep CNN, each output unit from a hidden layer is only connected to a square patch from the input that is geographically close to its location, while the CNN engine can discard the connections with all the other input units. By removing the relatively weak connections, the number of parameters that need to be trained by the CNN engine is greatly reduced, which contributes to the higher computational efficiency of the CNN engine that utilizes this sparse connectivity feature.

In some embodiments, CNN engine 114 constitutes a regression tool to automatically generate AC power system flow (ACPF) results based on known system parameters. Deep CNN is applicable for ACPF calculation because power system state variables (i.e., the bus voltage magnitude and bus voltage angle) are geographically interrelated like image pixels. On the other hand, since the bus voltage magnitude and the bus voltage angle have different dimensions, vectors relating to these two aspects cannot be output from the same deep CNN. As a result, two separate deep CNN structures are constructed within CNN engine 114 for bus voltage magnitude computation and bus voltage angle computation, respectively.

Figure 5:
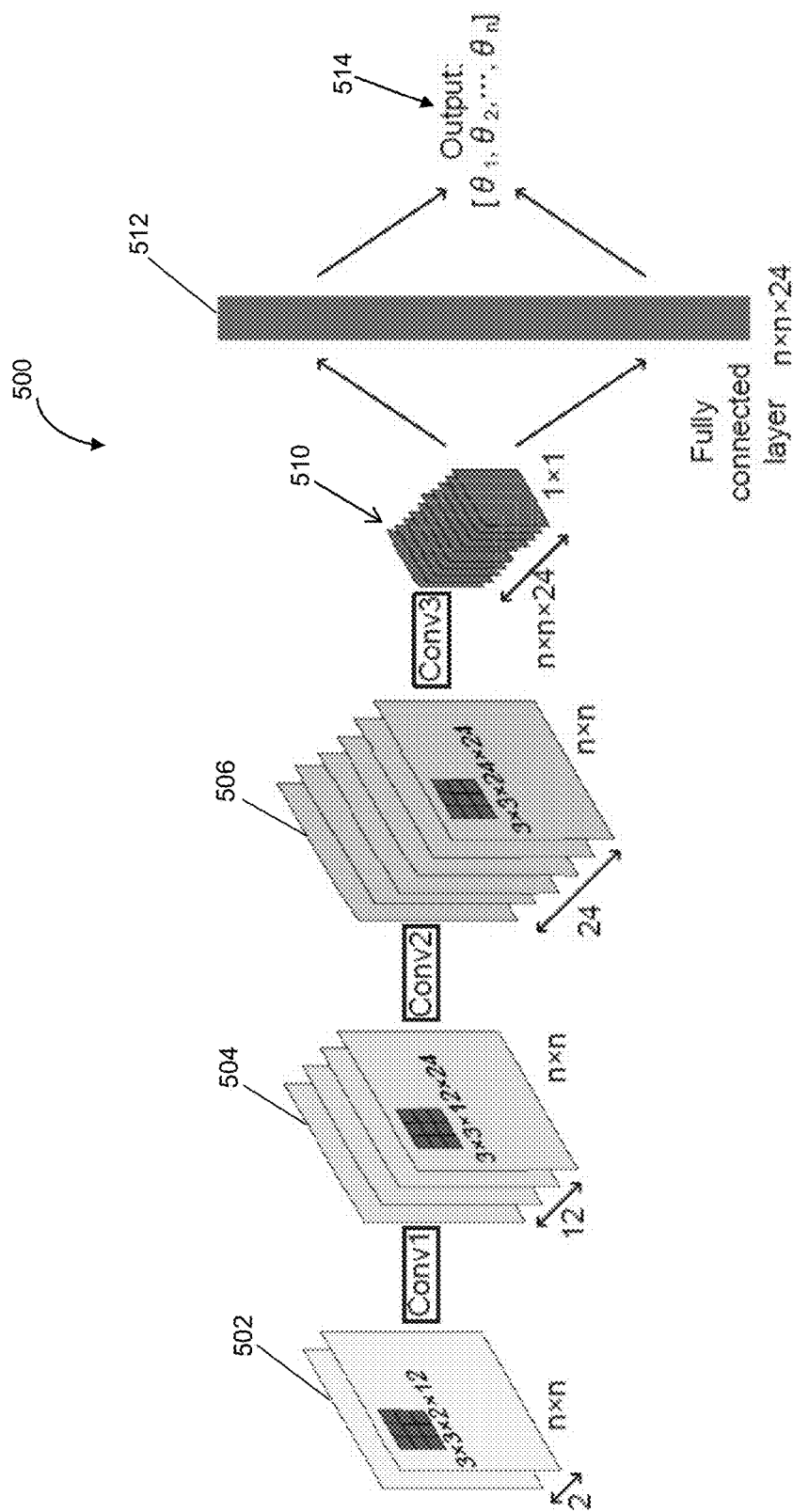
FIG. 5 is a block diagram of a deep convolutional neural network structure for determining a bus voltage angle according to an embodiment of the subject matter described herein.

In some embodiments, CNN engine 114 utilizes existing power system flow results as training data sets to analyze the mapping between power system control variables (i.e., bus power injection) and system state variables (i.e., bus voltage) without solving algebraic equations. Once CNN engine 114 is well-trained (as described below) based on a large amount of historical data or simulation results, CNN engine 114 can be directly applied to new test cases with different operation conditions to acquire power system flow results without further computation. This can be 10×-100× times faster than the traditional model-based power system flow techniques, such as the Newton-Raphson power system flow calculation. To accelerate the training process of CNN engine 114, a neural network for each of the bus voltage angle and the bus voltage magnitude are trained separately. This notion of separate training follows the idea of the decoupled feature of power system flows. More specifically, real power is closely related to voltage angle, while reactive power is closely related to voltage magnitude. For example, a bus voltage angle CNN structure as depicted in FIG. 5 can be trained by CNN engine 114 separately from the bus voltage magnitude CNN depicted in FIG. 6 (as described below).

Figure 2:
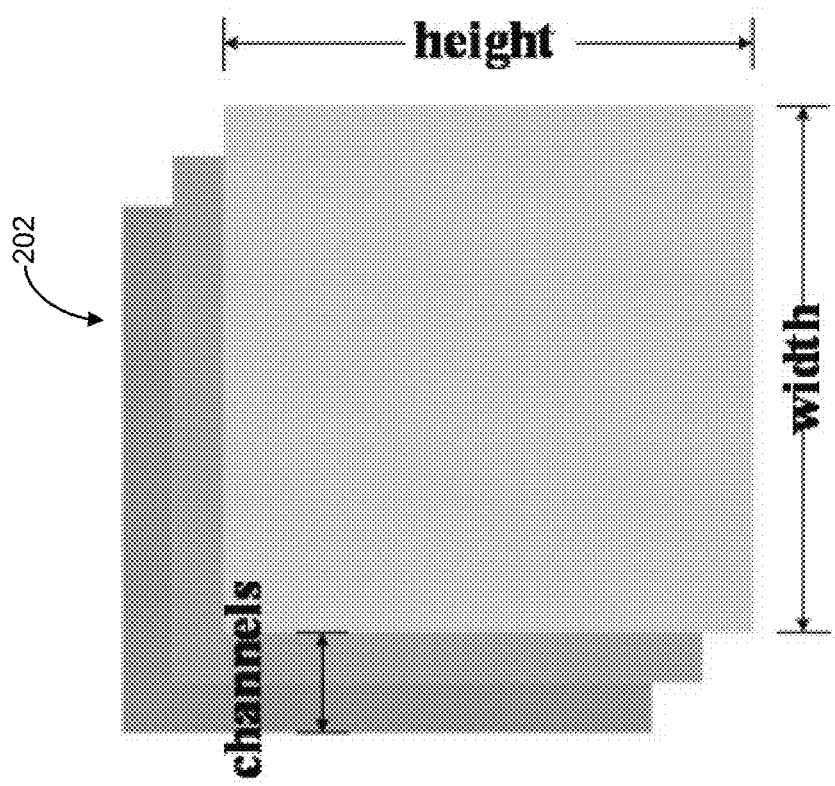
FIG. 2 is an illustration of an exemplary image parameter input according to an embodiment of the subject matter described herein.

As previously mentioned, the convolutional neural network is originally utilized for conducting image processing and/or image classification. As shown in FIG. 2, image data 202 usually comprises a grid-like structure that includes a plurality of channels (e.g., red, blue, and green channels). More specifically, each image of image data 202 has the following dimensions: width, height, and number of color channels. Here, the number of color channels means the basic color elements of the image. For instance, in a black/white image, the number of color channels is '1' (i.e., only grey scale is needed). In contrast, in a color image, the number of color channels is '3' (i.e., red, blue, and green channels). Each separate image of image data 202 is notably characterized by having a common height and width (i.e., each image has the same height and width as the other images of image data 202). Further, each image of image data 202 can be characterized as a 2-D square matrix filled with pixels. In some embodiments, a CNN engine executes a convolution operation that takes each pixel of an image as input, and subsequently outputs a weighted sum to represent local features (e.g., a feature element of a feature map) in accordance to sparse connectivity. Namely, the primary reason for this local sampling is that in an image, one pixel is closely related to its neighboring pixels, but is less related to the pixels that are far away. As such, all the local features can be efficiently aggregated for a CNN and/or the CNN engine to learn the information of the input.

Figure 3:
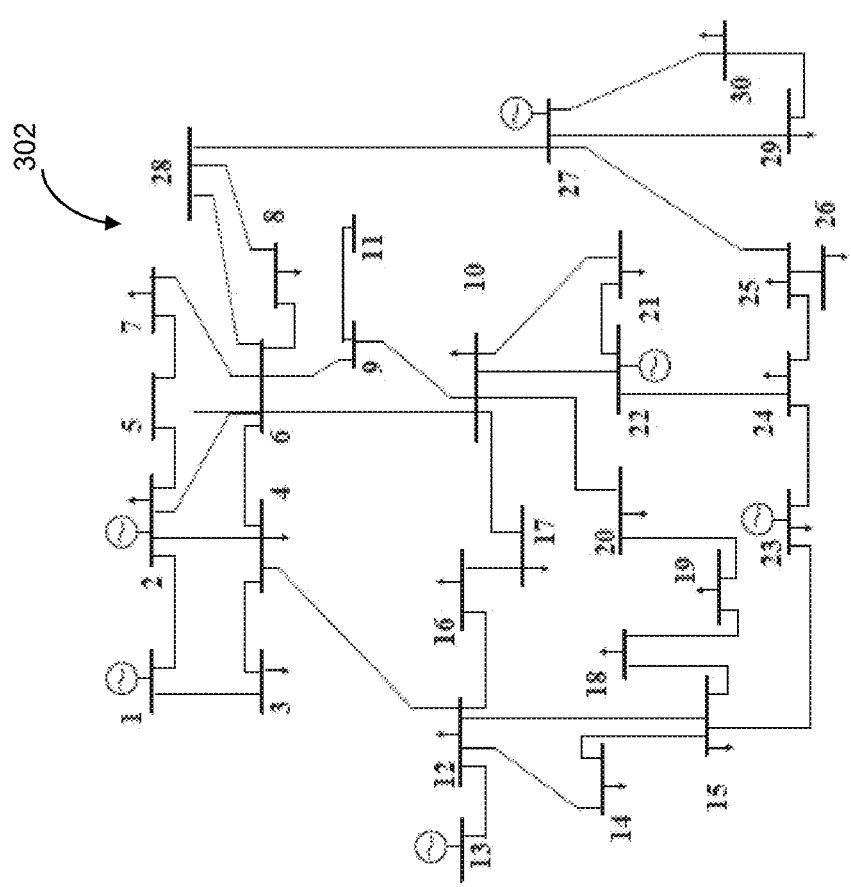
FIG. 3 is an illustration of an exemplary power system topology input according to an embodiment of the subject matter described herein.

FIG. 3 is an illustration of an exemplary power system topology input according to an embodiment of the subject matter described herein. Similar to the image data 202 depicted in FIG. 2, a given power system topology 302 also has a grid-like structure that includes a number of edges (e.g., buses and transmission lines) and source nodes (i.e., numbered 1-30). As indicated above, these nodes and edges represent the physical elements and connections of a power system grid. Power system topology 302 can also be transformed by the CNN engine to be represented by square matrices, e.g., nodal admittance matrices (as described below in FIG. 4). Notably, the voltage level at one bus is more affected by its neighboring buses than buses in the farther distance, which resembles the sparse connectivity feature of the image. As such, the similarities between image data and power system topology structures afford a CNN to be a natural fit for power system flow calculation.

Figure 4:
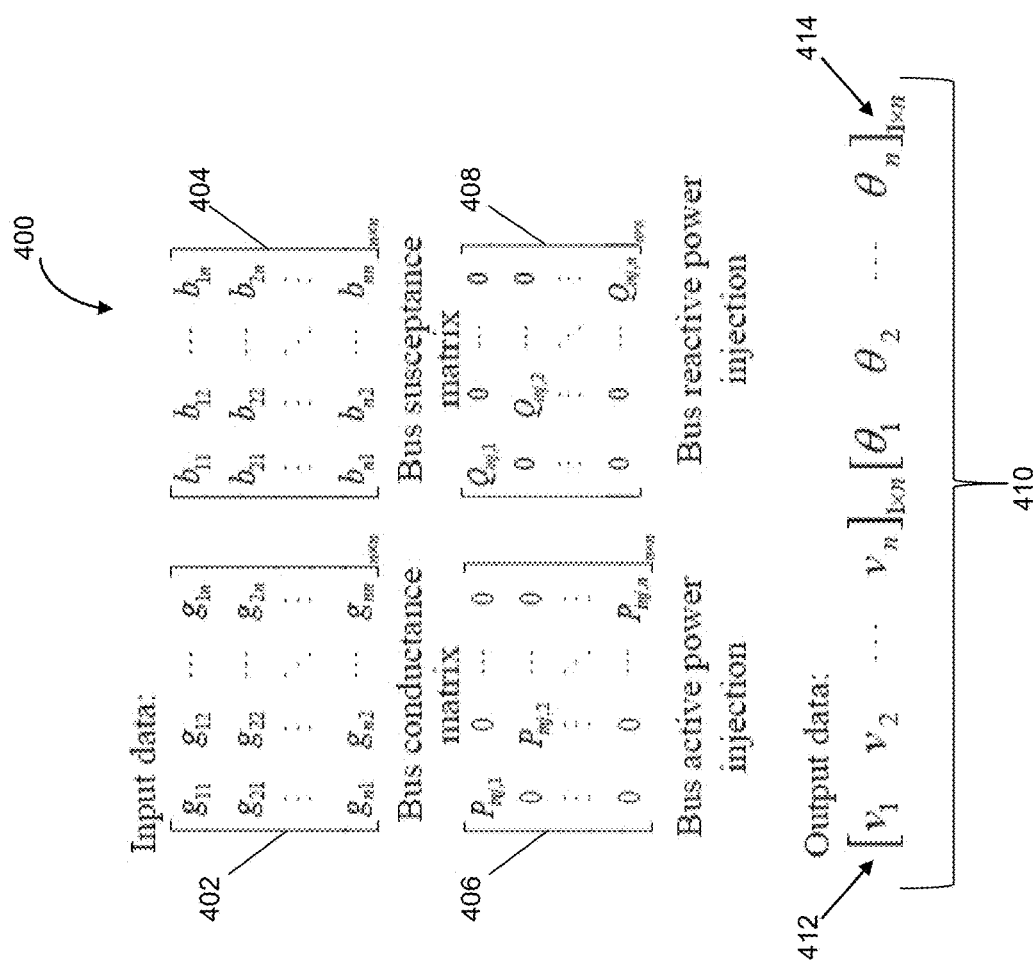
FIG. 4 is an illustration of a matrix representation of the power system topology input according to an embodiment of the subject matter described herein.

FIG. 4 is an illustration of a matrix representation 400 of the power system topology input according to an embodiment of the subject matter described herein. For a power system flow calculation to be executed by CNN engine 114, a system topology (e.g., power system topology 302 depicted in FIG. 3) and bus power injection are required as inputs. Following the logic and analogy of image classification for the purposes of determining a power system flow equation, the power system grid topology can be described by using two n×n matrices, i.e., a bus conductance matrix 402 and a bus susceptance matrix 404, where n represents the number of buses. In addition, the input data may also include a bus active power injection matrix 406 and a bus reactive power injection matrix 408 that are represented by two n×n diagonal matrices, where the diagonal elements of the matrices include the power injection values. The output 410 of CNN engine 114 will be two 1×n vectors representing system state variables, i.e., a bus voltage angle vector 414 and a bus voltage magnitude vector 412, as shown in FIG. 4. In some embodiments, the above matrix representations can be adapted to power systems that are characterized by different scales by simply enlarging the dimension(s) of the matrix representation.

FIG. 5 is a block diagram of a deep convolutional neural network structure for determining a bus voltage angle according to an embodiment of the subject matter described herein. For example, FIG. 5 depicts a voltage angle CNN structure 500, which includes three convolution layers 502-506 that are used to conduct bus voltage angle training for CNN engine 114 (shown in FIG. 1). In some embodiments, a first convolutional layer 502 comprises matrices with the size of [3, 3, 2, 12], a second convolutional layer 504 comprises matrices with the size of [3, 3, 12, 24], and a third convolutional layer 506 comprises matrices with the size of [3, 3, 24, 24]. The extracted features from the three convolutional layers 502-506 can then be further flattened to a vector 510. The flattened vector 510 will be compelled by CNN engine 114 to proceed through a fully connected layer 512. Notably, fully connected layer 512 is a mechanism used by CNN engine 114 to transform the generated feature maps into one or more voltage angle vectors 514. Further, a mean square error (MSE) can be set by CNN engine 114 as a loss function that is used to update the value of weights and biases in the convolution kernel(s) 502-506. In some embodiments, the MSE is the mean value of the difference between the actual voltage angle and the estimated voltage angle produced by deep CNN for all the training samples.

In some embodiments, CNN engine 114 is configured to execute a voltage angle CNN (e.g., voltage angle CNN 118 in FIG. 1) that includes a convolution operation on the power system input as follows. For example, given an input I with a matrix size of n×n×m, a convolution kernel (or convolution filter) with the size of c×c×m is constructed by CNN engine 114 to extract a feature element by scanning through the entire input. Notably, the input I matrix and the convolution kernel must have the same depth in the third dimension (i.e., m=m). The extracted feature element is portion of the feature map, and is obtained via the following weighted sum operation:

$$I_{new}(i, j) = b + \sum_{u=1}^{c} \sum_{v=1}^{c} \sum_{k=1}^{m} I(i', j', k') \cdot \omega(u, v, k)$$

In this equation, b is the bias, I(i', j', k') is the original element in the input, and ω(u, v, k) is the weight element of the convolution kernel. The size of the convolution kernel is usually smaller than the input, i.e., c<n. Starting from point I(1, 1, 1), CNN engine 114 uses the convolution kernel to sample a square shaped area c×c×m on the input matrix, and conducts the weighted sum operation to obtain the new element $I_{new}(i,j)$ for the feature map. CNN engine 114 subsequently moves the convolution kernel to the next square area within the input matrix with a certain step size until the entire input matrix is scanned. If there are 'S' convolution kernels, then 'S' feature maps will be generated, each with different weights for local features. The function of multiple feature maps is to observe the input from different perspectives to achieve a comprehensive perception.

Figure 6:
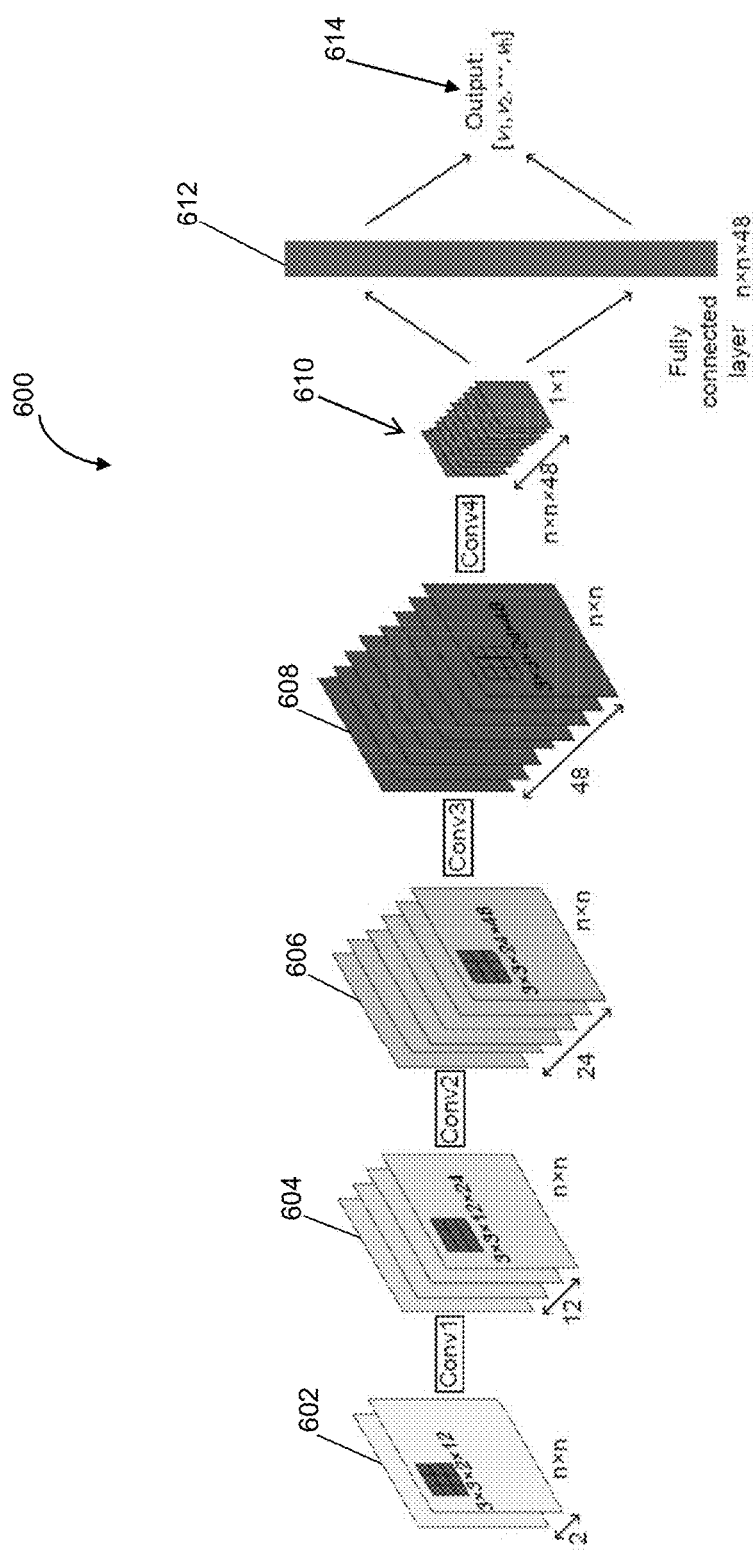
FIG. 6 is a block diagram of a deep convolutional neural network structure for determining a bus voltage magnitude according to an embodiment of the subject matter described herein.

FIG. 6 is a block diagram of a deep convolutional neural network structure for determining a bus voltage magnitude according to an embodiment of the subject matter described herein. Notably, FIG. 6 depicts a voltage magnitude CNN structure 600, which includes four convolution layers 602-608 that are used to conduct bus voltage magnitude training for CNN engine 114. In some embodiments, a first convolutional layer 602 comprises matrices with the size of [3, 3, 2, 12], a second convolutional layer 604 comprises matrices with the size of [3, 3, 12, 24], a third convolutional layer 606 comprises matrices with the size of [3, 3, 24, 48], and a fourth convolutional layer 608 comprises matrices with the size of [3, 3, 48, 48]. The extracted features from the three convolutional layers 602-608 are further flattened to a vector 610. In some embodiments, the number of convolutional layers for the neural network executed by CNN engine 114 (shown in FIG. 1) are optimized via trial and error. For example, multiple experiments have been conducted on different number of layers to achieve a desirable accuracy for CNN engine 114. The flattened vector 610 will be compelled by CNN engine 114 to proceed through a fully connected layer 612. Notably, fully connected layer 612 is a mechanism used by CNN engine 114 to transform the generated feature maps into voltage magnitude vectors 614. Further, a mean square error (MSE) is set by CNN engine 114 as a loss function that is used to update the value of weights and biases in the convolution kernel(s) 602-608.

TABLE I

Power flow result from deep CNN simulation

| | Errors | | Training time(s) | |
|---|---|---|---|---|
| Case | θ | v | θ | v |
| 5 | 4.7e−4 | 8.4e−5 | 8.4 | 11.4 |
| 9 | 1.7e−3 | 2.6e−4 | 8.8 | 11.5 |
| 14 | 8.4e−4 | 1.3e−4 | 9.4 | 12.8 |
| 30 | 5.3e−4 | 8.6e−5 | 22.3 | 33.1 |
| 57 | 1.9e−3 | 2.4e−4 | 77.1 | 127.9 |
| 118 | 2.0e−3 | 9.6e−4 | 333.9 | 203.3 |
| 145 | 4.7e−2 | 2.5e−4 | 508.9 | 499.3 |
| 181 | 2.0e−2 | 1.2e−3 | 906.9 | 1401.0 |

Table 1 illustrates an example of power system flow results from a deep CNN simulation executed by CNN engine 114. In this example, all of the test cases are from IEEE standard test cases. The size of the training set is '700' and the size of the testing set is '300'. The number of iterations for voltage angle training and voltage magnitude training for CNN engine 114 are '800' and '1000', respectively. The errors in Table 1 refer to the per unit mean absolute value as compared to the results from model-based methods. Notably, deep CNN as conducted by CNN engine 114 maintains a considerably high level of accuracy. Further, the respective training times shown in Table 1 are within acceptable range even for large-scale systems. It should be noted that once a neural network of CNN engine 114 is well-trained, the testing results output from CNN engine 114 can be executed instantaneously. As such, the testing time is not reported in Table 1. Moreover, a 10×-100× speedup will be easily achieved by CNN engine 114 in terms of computing speed.

Figure 7:
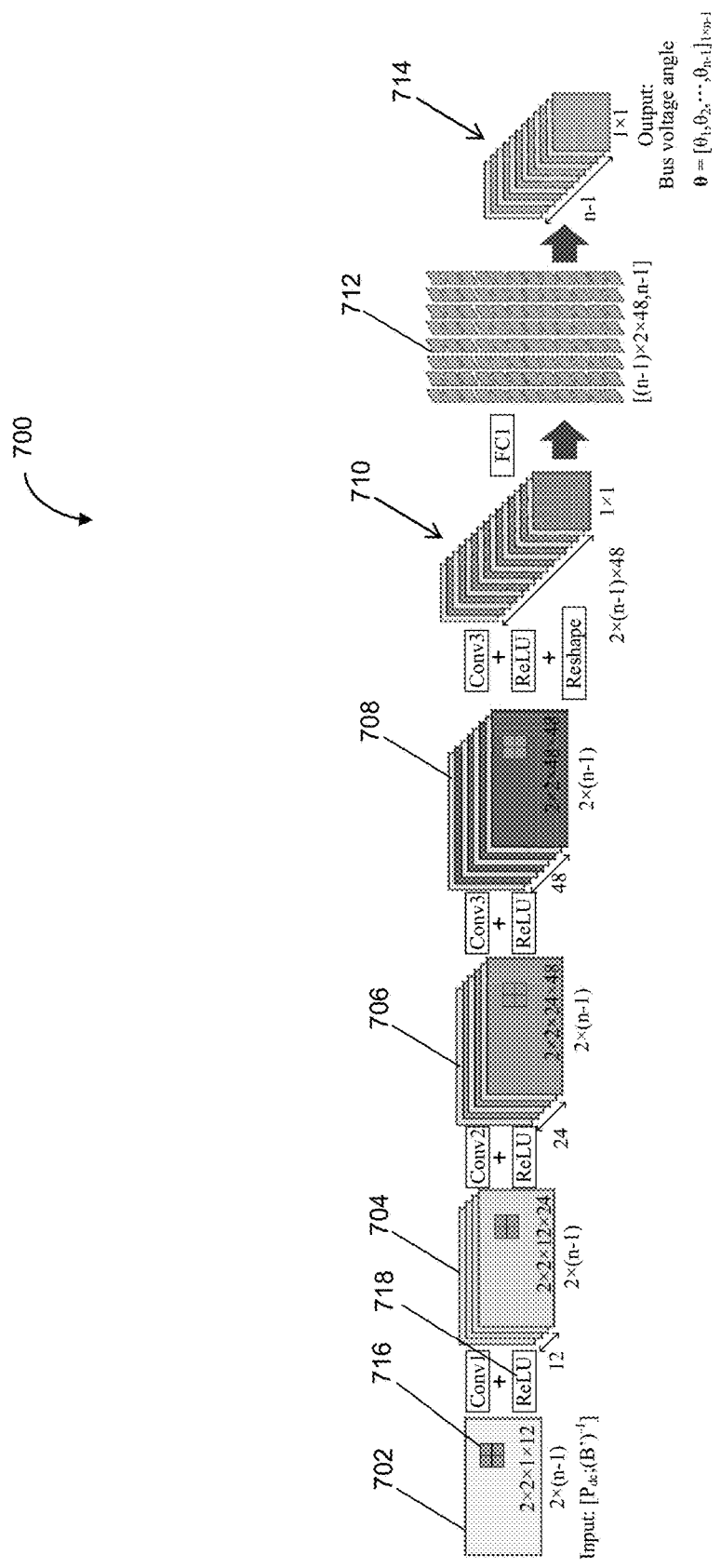
FIG. 7 is a block diagram of a deep convolutional neural network structure for executing a bus voltage angle calculation according to an embodiment of the subject matter described herein.

In an alternate embodiment, CNN engine 114 may utilize a voltage angle CNN that is characterized by a voltage angle CNN structure 700 illustrated in FIG. 7. Notably, voltage angle CNN structure 700 is executed by CNN engine 114 and includes four convolutional ("Conv") layers 702-708 and one fully-connected ("FC") layer 712. The function of each of convolutional layers 702-708 is to extract features from the input power system raw data (e.g., input matrix). Each convolutional layer includes a convolution kernel or filter (e.g., convolutional kernel 716), which is shown as a 2×2 square in each of the convolutional layers of FIG. 7. The CNN engine 114 (and/or CNN structure 700) utilizes convolution kernel 716 to conduct the following convolution operation for feature extraction:

$$I_{new}(i, j) = \sum_{u=1}^{c} \sum_{v=1}^{c} I(u, v) \cdot \omega(u, v) + b$$

In this equation, I(u,v) is a single unit in the original input (e.g., a portion of the input matrix), w (u,v) is a single unit in the convolution kernel 716, which is also called the weight, and c is the size of convolution kernel 716. Further, b is the bias parameter and $I_{new}$(i,j) is a single unit in the output (e.g., element of a feature map being generated by CNN engine 114). Notably, each unit in the output is equal to the weighted sum of c×c units in the input. In particular, the output contains the aggregated local information based on c×c input units. All the output units are collectively grouped by CNN engine 114 to formulate a feature map. Further, the more convolution kernels the CNN engine 114 uses, the more feature maps that can be generated by CNN engine 114 to provide sufficient information for deep CNN model regression.

In the constructed voltage angle CNN structure 700 depicted in FIG. 7, the size of the convolution kernel 716 for the first convolution layer is [2, 2, 1, 12]. Similarly, the convolutional kernel size for each of convolutional layers 704-708 is [2, 2, 12, 24], [2, 2, 24, 48], and [2, 2, 48, 48], respectively. In each of these convolutional kernel vectors, the first three numbers are the height, width, and depth of the convolution kernel. Further, the last vector element represents the number of kernels or filters. After processing the input at convolutional layers 702-708, CNN engine 114 generates a respective number of features maps. Notably, the generated feature maps are processed by CNN engine 114 using an activation function 718. The activation function 718 is configured to delinearize the regression model in the above convolution operation for feature extraction. This is necessary because the original mathematical relationship between bus power injection and bus voltage are not linear (i.e., they are the simplified power system flow equations) and cannot be fully represented by the linear convolution operation. Notably, the limitation of linear transformations can be overcome by a CNN engine that utilizes an activation function (e.g., activation function 718).

In some embodiments, CNN engine 114 applies a rectified linear unit (i.e., ReLU) as the activation function 718. For example, the ReLU function has a quasi-linearity feature that makes the function preserve a high generalization ability as a linear model, thereby allowing the ReLU function to be applicable in deep CNN regression operations executed by CNN engine 114.

As shown in FIG. 7, the output (e.g., vector 710) from the last convolutional layer 708 will traverse a fully-connected layer 712 that is executed by CNN engine 114. In some embodiments, the function of fully-connected layer 712 is configured to transform all the extracted feature elements derived from the power system raw data to the desired output via matrix multiplication (as executed by the CNN engine). The output 714, i.e., bus voltage magnitude vector and/or bus voltage angle vector, are then utilized by CNN engine 114 to calculate a security index (SI) to evaluate the operation status of the power system operating under N–1 contingency.

In some embodiments, the security index can be defined and determined by CNN engine 114 to evaluate the contingency severity associated with a give power system topology using the following equation:

$$SI = \left[ \sum_i \left( \frac{d_{v,i}^u}{g_{v,i}^u} \right)^{2n} + \sum_i \left( \frac{d_{v,i}^l}{g_{v,i}^l} \right)^{2n} + \sum_l \left( \frac{d_{p,l}}{g_{p,l}} \right)^{2n} \right]^{\frac{1}{2n}}$$

In this security index equation, i is the bus index, $d_{v,j}^u$ is the distance between the $i^{th}$ bus voltage level and the upper voltage alarm limit, and $d_{v,j}^l$ is the distance between the $i^{th}$ bus voltage level and lower voltage alarm limit. Further, $g_{v,j}^u$ and $g_{v,j}^l$ are the distances between the upper/lower alarm limit and upper/lower security limit of voltage level. Moreover, l is the index of lines, $d_{p,l}$ is the distance between the $l^{th}$ line flow and the line flow alarm limit, and $g_{p,l}$ is the distance between the alarm limit and security limit of line flow. Lastly, n is a constant exponent, which is set to '1'.

In a direct current (DC) power system flow model, the active power system flow equation can be simplified based on three assumptions: 1) the bus voltage magnitude is around 1.0 per unit (PU), 2) the difference between two neighboring bus voltage angles is small, and 3) the transmission line resistance is negligible as compared to the line reactance. The linearized power system flow equation can be represented as follows:

$$P_{ij} = U_i^2 g_{ij} - U_i U_j (g_{ij} \cos \theta_{ij} + b_{ij} \sin \theta_{ij}) \approx -(\theta_i - \theta_j)$$
$$b_{ij} \Rightarrow P = -B'\theta \Rightarrow \theta = -(B')^{-1}P$$

where $U_i$ and $U_j$ are the bus voltage magnitudes, $\theta_i$ and $\theta_j$ are the bus voltage angles, and $g_{ij} + jb_{ij}$ is the (i,j) item in the $Y_{bus}$ matrix. Since the goal of the CNN engine is to simulate AC power system flow, a reactive power system flow equation can be simplified following the same assumptions:

$$Q_{ij} = -U_i^2 b_{ij} + U_i U_j (b_{ij} \cos \theta_{ij} - g_{ij} \sin \theta_{ij}) \approx -(U_i - U_j)$$
$$b_{ij} \Rightarrow Q = -B'U \Rightarrow U = -(B')^{-1}Q$$

Notably, a deep CNN structure based on these two equations can be constructed and utilized by the CNN engine. For the voltage angle computation, the input to the voltage angle CNN executed by CNN engine 114 are $-(B')^{-1}$ and P, and the output will be θ. In some embodiments, for the voltage angle training of CNN engine 114, the input matrix includes bus active power injection (e.g., matrix 406 shown in FIG. 4) and the B' matrix. For example, the B' matrix comprises the imaginary part of the bus admittance matrix (e.g., $Yb_{us}$ matrix). Likewise, for the voltage magnitude computation, the input to the voltage angle CNN will be $-(B')^{-1}$ and Q and the output will be U. However, because the input parameters differ in their dimensions, e.g., in the voltage angle computation, $-(B')^{-1}$ is a (n−1)×(n−1) matrix and P is a (n−1)×1 vector, where n represents the number of buses, adjustments to the $-(B')^{-1}$ matrix is required. For example, to tailor the two inputs to the same size, CNN engine 114 can remove the non-diagonal elements in the $-(B)^{-1}$ matrix and only keep the (n−1) diagonal elements as the input. Because deep CNN regression is a data-driven method, the regression error caused by the missing data in $-(B)^{-1}$ can be automatically made up via iterative training based on existing data samples. Notably, the reduction of input data size decreases both neural network model complexity and computation burden of the CNN engine. By training CNN engine 114 in this manner, the volume of training data is greatly reduced. The CNN structures for the voltage angle CNN and the voltage magnitude CNN executed by CNN engine 114 are shown in FIGS. 5 and 6, respectively (as described above)

Figure 8:
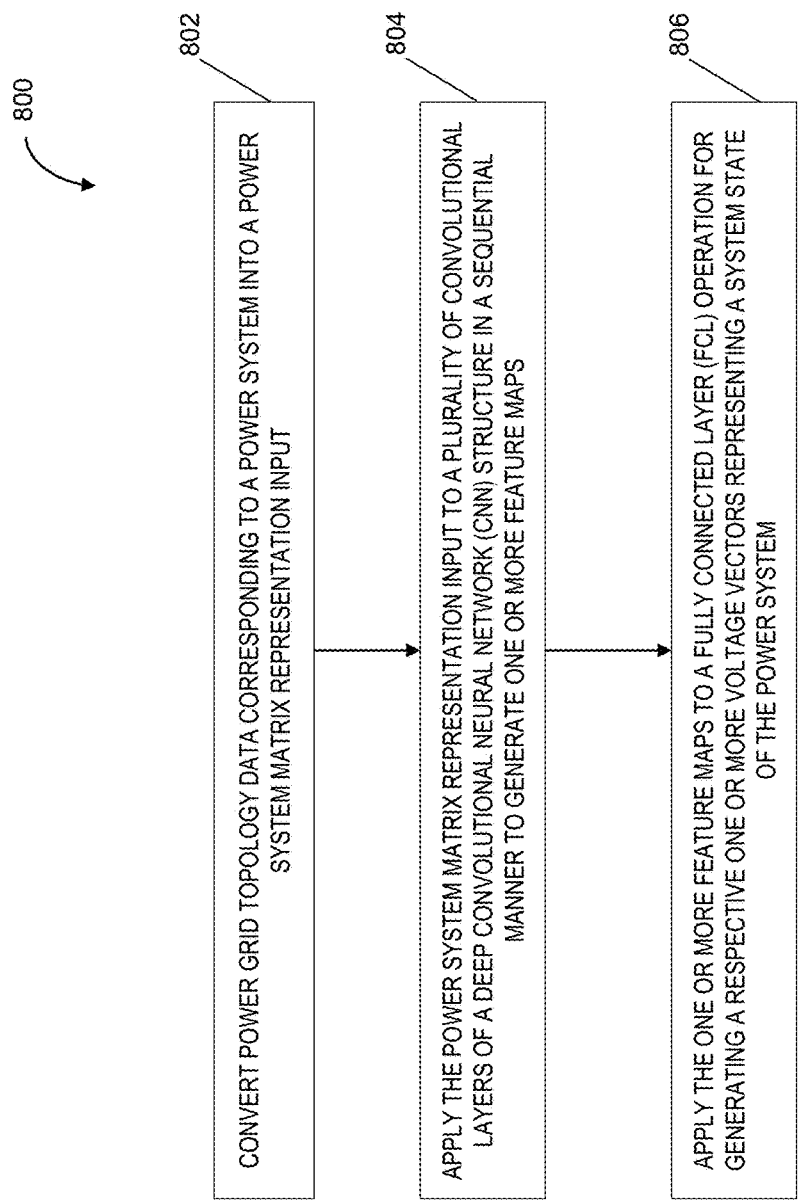
FIG. 8 is a flow chart illustrating an exemplary process for determining a system state of a power system using a convolutional neural network according to an embodiment of the subject matter described herein.

FIG. 8 is a flow chart illustrating an exemplary process or method 800 for determining a system state of a power system using a convolutional neural network according to an embodiment of the subject matter described herein. In some embodiments, method 800 depicted in FIG. 8 is an algorithm stored in memory that when executed by a hardware processor performs one or more of blocks 802-806. For example, method 800 may be executed and/or embodied by a CNN engine (e.g., CNN engine 114 shown in FIG. 1). In block 802, power grid topology data corresponding to a power system is converted into a power system matrix input. In some embodiments, a CNN engine executed on power grid flow assessment entity or device is configured to receive power grid topology data that is representative of a power system, such as a power distribution system grid. After receiving the topology data, the CNN engine transforms the topology data into a power system matrix representation input. For example the power system matrix representation input may comprise a plurality of nodal admittance matrices associated with the power system raw data.

In block 804, the power system matrix representation input is applied to a plurality of convolution layers of a deep CNN structure in a sequential manner in order to generate one or more feature maps. In some embodiments, the CNN engine executes a plurality of CNN structures. For example, the CNN engine can host a CNN structure for bus voltage angle calculation and a CNN structure for bus voltage magnitude calculation. Notably, the CNN engine utilizes at least two separate CNN structures because the bus voltage magnitude and bus voltage angle have different dimensions that prevent the output to be determined from the same deep CNN. In some embodiments, each CNN structure includes a plurality of convolution layers that are used to sequentially process he power system matrix representation input. for example, a power system matrix can be provided as input to a first convolution layer in which the CNN engine utilizes a convolution kernel (or filter) to systematically determine feature elements to produce a feature map (as described above).

In block 806, one or more feature maps are applied to a fully connected layer operation in order to generate a respective one or more voltage factors. In some embodiments, the generated feature maps that are output from the last convolutional layer will be directed by the CNN engine to go through a fully connected layer of the CNN structure. Notably, the function of the fully connected layer is to transform all the extracted features contained in the generated feature maps to the desired output via matrix multiplication. In particular, the output includes a bus voltage magnitude vector and a bus voltage angle vector. in some embodiments, these system state variables can be used by the CNN engine to calculate a security index value which in turn is utilized by the CNN engine to assess the power system operation status. Further, the CNN engine be configured to issue an alert or remedy in the event the security index value falls below a predefined threshold value (that is indicative of a secure power grid system).

Exemplary Case Study

In some embodiments, the image-processing-like, deep CNN regression models for ACPF calculation under N−1 contingency as executed by the disclosed CNN engine were tested on the IEEE 9, 30, 57, 118, and 300-bus systems, a WECC 181-bus system, and a European 1354-bus system to verify the accuracy and computing efficiency of the CNN engine. To implement multi-scenario uncertainty, Monte Carlo simulation was used by the CNN engine to create load and renewable energy variations in the training samples. For load uncertainty, both the bus active injection variation and reactive power injection variation were assumed to follow a uniform distribution within the range of [0.8, 1.2] of the base case. Also, the bus reactive power injection is further multiplied by a factor uniformly drawn from the range [0.15, 0.25]. For renewable energy uncertainty, 40% of the conventional generators in the original test cases were changed into wind generators, and the forecast error of wind generation follows a normal distribution with zero mean and a standard deviation of 0.05. For N−1 contingency, one line is randomly tripped in each training sample. Also, both the training sample size and test sample size are guaranteed to be large enough to cover all of the N−1 line outages. In some embodiments, the hardware environment for the CNN engine configured to conduct deep CNN training includes a Nvidia GeForce GTX 1080 Ti Graphic Card with 11 Gigabyte (GB) memory and a 1.582 Gigahertz (GHz) core clock. The software environment for the CNN engine further includes the open-source deep learning platform TensorFlow for the proposed approach and Matpower for traditional model-based approach. The regression results are shown in Table 2.

TABLE II

AC POWER SYSTEM FLOW RESULTS OF DEEP CNN REGRESSION

| Case | No. of samples | | Errors | | Training time(s) | | Classification |
| --- | --- | --- | --- | --- | --- | --- | --- |
| | Training | Test | θ | ν | θ | ν | Accuracy |
| 9 | 2420 | 1036 | 8.2e−3 | 3.1e−3 | 187.4 | 186.1 | 99.03% |
| 30 | 2590 | 1110 | 2.2e−3 | 9.9e−4 | 195.1 | 195.5 | 97.03% |
| 57 | 3359 | 1439 | 6.0e−3 | 2.9e−3 | 265.2 | 263.0 | 97.57% |
| 118 | 3028 | 1297 | 1.1e−2 | 7.1e−4 | 250.8 | 240.1 | 97.30% |
| 181 (WECC) | 2383 | 1020 | 6.8e−2 | 8.9e−3 | 232.9 | 212.8 | 95.49% |
| 300 | 2561 | 1097 | 9.0e−2 | 4.0e−3 | 370.1 | 299.0 | 97.45% |
| 1354 (Eu.) | 4900 | 2100 | 1.4e−2 | 7.2e−4 | 6625.4 | 4899.5 | 95.24% |

In Table 2, the ratio of training set size to test set size is set to approximately 7:3. The errors of θ and ν are the per unit mean absolute value over the test set compared with the results from a model-based AC power system flow calculation. These estimated state values are subsequently used by the CNN engine to calculate a security index to classify the power system security status. The classification accuracy listed in the last column of Table 2 is the ratio between i) the number of test samples that has been correctly classified based on the deep CNN regression results and ii) the total number of test samples. As indicated in Table 2, a deep CNN model executed by the CNN engine is characterized by a considerably high accuracy for the ACPF calculation for both small-scale and large-scale power systems. Further, the training time for the CNN engine is within an acceptable range given that the training is completed off-line.

To validate the computational efficiency of deep CNN regression, the CNN engine is configured to compare calculation time of the AC power system flow with N−1 contingency using both deep CNN and model-based AC power system flow methods, as shown in Table 3.

TABLE III

TEST TIME COMPARISON

| Case | Test size | Test time(s) (deep CNN) | Test time(s) (model-based) | Acceleration Ratio |
|---|---|---|---|---|
| 9 | 1036 | 0.141 | 9.55 | 67.7 |
| 30 | 1110 | 0.156 | 14.35 | 92.0 |
| 57 | 1439 | 0.321 | 22.74 | 70.8 |
| 118 | 1297 | 0.462 | 32.25 | 69.8 |
| 181 (WECC) | 1020 | 0.206 | 33.12 | 160.8 |
| 300 | 1097 | 0.262 | 55.69 | 212.6 |
| 1354 (Eu.) | 2100 | 2.720 | 78.01 | 28.7* |
| | | | | Avg. = 100.3 |

In Table 3, the last column shows the ratio of the acceleration based on the computation time of deep CNN and the model-based ACPF method. The deep CNN approach as executed by the CNN engine is about 30 to 200 times faster than the latter (i.e., with an average of 100 times faster). This is because the well-trained deep CNN hosted by the CNN engine has high generalization to unseen test cases and can automatically generate power system flow results under a newly provided input without any iterative calculation of the power system flows.

Advantages of the subject matter described herein include the use of a CNN engine that is capable of executing accelerated power system flow calculations for power system security assessments. Notably, traditional model-based power system flow calculation methods encounter huge computational burdens and fail to provide real-time and multi-scenario analysis due to the use of resource intensive mathematical models. In contrast, the disclosed CNN engine utilizes a plurality of deep CNN structures to obtain power system flow results as a data mining base solution as opposed to the traditionally used analytical solutions. As such, the disclosed CNN engine is able to leverage a well-trained neural network to greatly improve the computational efficiency associated with determining the system state variables associated with a power system grid. Specifically, the CNN engine does not require mathematical modeling but rather is able to learn the features of test systems via data mining. Consequently, typical modeling inaccuracies are avoided. This is especially critical in light of the increasing penetration of renewable energy elements into the power grid system, which has raised the concern of the system operation security under N−1 contingency screenings. As such, a CNN engine that is configured to determine a system state of a power system using a convolutional neural network as described herein improves the technological field of power system grid security by accelerating the computation speed for N−1 contingency screen in a more efficient manner.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a," "an," and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising," which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

The embodiments disclosed herein are provided only by way of example and are not to be used in any way to limit the scope of the subject matter disclosed herein. As such, it will be understood that various details of the presently disclosed subject matter may be changed without departing from the scope of the presently disclosed subject matter. The foregoing description is for the purpose of illustration only, and not for the purpose of limitation.

What is claimed is:

1. A method for determining a system state of a power system using a convolutional neural network, the method comprising:
    converting power grid topology data corresponding to a power system into a power system matrix representation input;
    applying the power system matrix representation input to a plurality of convolutional layers of a deep convolutional neural network (CNN) structure in a sequential manner to generate one or more feature maps; and
    applying the one or more feature maps to a fully connected layer (FCL) operation for generating a respective one or more voltage vectors representing a system state of the power system, wherein the one or more voltage vectors includes a bus voltage angle vector and a bus voltage magnitude vector that are generated using separate deep CNN structures.

2. The method of claim 1 wherein the one or more feature maps are generated from feature elements extracted from the power system matrix representation input using a respective number of convolution kernels.

3. The method of claim 1 comprising utilizing the bus voltage angle vector and the bus voltage magnitude vector to calculate a security index value that is used to evaluate an operation status of the power system.

4. The method of claim 1 comprising de-linearizing the one or more feature maps via an application of an activation function.

5. The method for claim 1 wherein the deep CNN structure is initially generated by establishing a mapping between previously known power system control variables and associated system state variables.

6. A system for determining a system state of a power system using a convolutional neural network, the system comprising:
    a power grid flow assessment (PGFA) entity comprising at least one processor and memory; and a deep convolution neural network (CNN) engine stored in the memory and when executed by the at least one processor is configured for converting power grid topology data corresponding to a power system into a power system matrix representation input, applying the power system matrix representation input to a plurality of convolutional layers of a deep CNN structure in a sequential manner to generate one or more feature maps, and applying the one or more feature maps to a fully connected layer (FCL) operation for generating a respective one or more voltage vectors representing a system state of the power system, wherein the one or more voltage vectors includes a bus voltage angle vector and a bus voltage magnitude vector that are generated using separate deep CNN structures.

7. The system of claim 6 wherein the one or more feature maps are generated from feature elements extracted from the power system matrix representation input using a respective number of convolution kernels.

8. The system of claim 6 comprising utilizing the bus voltage angle vector and the bus voltage magnitude vector to calculate a security index value that is used to evaluate an operation status of the power system.

9. The system of claim 6 comprising de-linearizing the one or more feature maps via an application of an activation function.

10. The system of claim 6 wherein the deep CNN structure is initially generated by establishing a mapping between previously known power system control variables and associated system state variables.

11. A non-transitory computer readable medium having stored thereon executable instructions that when executed by a processor of a computer controls the computer to perform steps comprising:

converting power grid topology data corresponding to a power system into a power system matrix representation input;

applying the power system matrix representation input to a plurality of convolutional layers of a deep convolutional neural network (CNN) structure in a sequential manner to generate one or more feature maps; and applying the one or more feature maps to a fully connected layer (FCL) operation for generating a respective one or more voltage vectors representing a system state of the power system, wherein the one or more voltage vectors includes a bus voltage angle vector and a bus voltage magnitude vector that are generated using separate deep CNN structures.

12. The non-transitory computer readable medium of claim 11 wherein the one or more feature maps are generated from feature elements extracted from the power system matrix representation input using a respective number of convolution kernels.

13. The non-transitory computer readable medium of claim 11 comprising utilizing the bus voltage angle vector and the bus voltage magnitude vector to calculate a security index value that is used to evaluate an operation status of the power system.

14. The non-transitory computer readable medium of claim 11 wherein the deep CNN structure is initially generated by establishing a mapping between previously known power system control variables and associated system state variables.

* * * * *